United States Patent
Ariyama et al.

(10) Patent No.: US 11,905,875 B2
(45) Date of Patent: Feb. 20, 2024

(54) VEHICLE HEAT EXCHANGE SYSTEM

(71) Applicants: Mahle International GmbH, Stuttgart (DE); Mahle Filter Systems Japan Corporation, Tokyo (JP)

(72) Inventors: Masahiro Ariyama, Tokyo (JP); Katsuhiro Isoda, Tokyo (JP); Kenji Yamashita, Tokyo (JP)

(73) Assignees: MAHLE INTERNATIONAL GMBH (DE); MAHLE FILTER SYSTEMS JAPAN CORPORATION (JP)

( * ) Notice: Subject to any disclaimer, the term of this patent is extended or adjusted under 35 U.S.C. 154(b) by 410 days.

(21) Appl. No.: 17/418,774

(22) PCT Filed: Dec. 19, 2019

(86) PCT No.: PCT/EP2019/086412
§ 371 (c)(1),
(2) Date: Jun. 25, 2021

(87) PCT Pub. No.: WO2020/136090
PCT Pub. Date: Jul. 2, 2020

(65) Prior Publication Data
US 2022/0074337 A1 Mar. 10, 2022

(30) Foreign Application Priority Data
Dec. 28, 2018 (JP) .................... 2018-248395

(51) Int. Cl.
*F01P 3/20* (2006.01)
*B60K 1/00* (2006.01)
(Continued)

(52) U.S. Cl.
CPC ...... *F01P 3/20* (2013.01); *B60K 1/00* (2013.01); *B60K 11/04* (2013.01); *B60K 6/22* (2013.01);
(Continued)

(58) Field of Classification Search
CPC ..... F01P 3/20; B60K 1/00; B60K 11/04; B60K 6/22; B60K 2001/006; B60Y 2200/92; B60Y 2306/05
(Continued)

(56) References Cited

U.S. PATENT DOCUMENTS

| | | | |
|---|---|---|---|
| 9,186,953 B2 * | 11/2015 | Burke | F02M 31/20 |
| 9,784,176 B2 * | 10/2017 | Carter | F02N 19/10 |
| 10,041,380 B2 * | 8/2018 | Seo | F02M 31/10 |
| 10,287,964 B2 * | 5/2019 | Tokozakura | B60K 1/02 |

(Continued)

FOREIGN PATENT DOCUMENTS

| | | |
|---|---|---|
| EP | 2316684 A1 | 5/2011 |
| FR | 2949515 A1 | 3/2011 |

(Continued)

OTHER PUBLICATIONS

English abstract for FR-2949515.
English abstract for JP-2011-098628.
English abstract for JP-2012-047309.

*Primary Examiner* — Jon T. Schermerhorn, Jr.
(74) *Attorney, Agent, or Firm* — Fishman Stewart PLLC

(57) ABSTRACT

A vehicle heat exchange system may include a first heat exchanger for exchanging heat between a first medium and a second medium, a second heat exchanger for exchanging heat between the first medium and a third medium, a third heat exchanger for exchanging heat between the second medium and the third medium, a switch valve, and a control unit. The switch valve may be configured to enable selective switching between (i) a first path that supplies the second medium that has passed through the third heat exchanger to an inverter via an inverter radiator and (ii) a second path that supplies the second medium that has passed through the third heat exchanger to the inverter via the first heat exchanger. The control unit may be configured to control the (Continued)

switch valve such that the second path is selected when the first medium is in a predetermined low-temperature state.

20 Claims, 5 Drawing Sheets

(51) Int. Cl.
*B60K 11/04* (2006.01)
*B60K 6/22* (2007.10)

(52) U.S. Cl.
CPC ..... *B60K 2001/006* (2013.01); *B60Y 2200/92* (2013.01); *B60Y 2306/05* (2013.01)

(58) Field of Classification Search
USPC .......................................................... 165/41
See application file for complete search history.

(56) References Cited

U.S. PATENT DOCUMENTS

| 11,186,164 | B2* | 11/2021 | Gramann ............... B60K 11/02 |
| 11,506,108 | B2* | 11/2022 | Tanaka .................... B60K 1/02 |
| 2004/0045749 | A1* | 3/2004 | Jaura ................... F16H 57/0412 |
| | | | 903/952 |
| 2010/0095700 | A1* | 4/2010 | Bush ....................... F25B 41/00 |
| | | | 62/323.3 |
| 2010/0243751 | A1* | 9/2010 | Bouysset ........... B60H 1/00392 |
| | | | 165/104.11 |
| 2012/0031140 | A1 | 2/2012 | Zhang et al. |
| 2012/0297820 | A1 | 11/2012 | Masuda et al. |
| 2015/0273976 | A1 | 10/2015 | Enomoto et al. |
| 2017/0144532 | A1* | 5/2017 | Tokozakura ........... B60K 6/445 |
| 2017/0175612 | A1 | 6/2017 | Tokozakura et al. |

FOREIGN PATENT DOCUMENTS

| JP | 2011-098628 A | 5/2011 |
| JP | 2012-047309 A | 3/2012 |

\* cited by examiner

VEHICLE HEAT EXCHANGE SYSTEM

CROSS-REFERENCE TO RELATED APPLICATIONS

This application claims priority to International Patent Application No. PCT/EP2019/086412, filed on Dec. 19, 2019, and Japanese Patent Application No. JP 2018-248395, filed on Dec. 28, 2018, the contents of both of which are hereby incorporated by reference in their entirety

TECHNICAL FIELD

The present disclosure relates to a vehicle heat exchange system that performs heat exchange of an internal combustion engine, an inverter, a motor, etc. of a hybrid vehicle and the like.

BACKGROUND

In recent years, hybrid vehicles (HEV) have been widely introduced to seek improved fuel efficiency. As HEVs run with both internal combustion engine and motor relied upon as their drive sources, effective utilization of their exhaust heat has become a challenge for realizing further improvement in fuel efficiency. And various solutions to this challenge have been disclosed (for example, see Japanese Patent Application Laid-Open No. 2011-098628).

According to a vehicle heat exchange system illustrated in Japanese Patent Application Laid-Open No. 2011-098628, in a vehicle heat exchange system that includes an engine cooling water circuit that cools an engine, a driving inverter that converts a DC current into an AC current and supplies it to the driving motor, and an HV cooling circuit that cools the driving motor, exhaust heat produced from the driving inverter and the driving motor is utilized to warm up the engine by warming the engine cooling water through performing heat exchange between the engine cooling water and the HV cooling water.

However, as the number of other types of exhaust heat has been increasing in modern vehicle heat exchange systems, utilization of the exhaust heat is not sufficient in existing systems. For example, in response to increase in the amount of heat generated from a motor as a result of increase in the output of the motor as well as reduction in the size of the motor, the number of hybrid vehicles is increased which are configured to apply an automatic transmission fluid (ATF) for use in lubrication of a decelerator (automatic transmission) to a power generation motor and/or a driving motor within a transmission case (gear case) so as to oil-cool these motors (for example, see the patent literature Japanese Patent Application Laid-Open No. 2012-047309), but the status quo is that the exhaust heat produced from these motors in such a configuration is not utilized effectively.

SUMMARY

The present disclosure is related to providing a vehicle heat exchange system capable of effectively utilizing exhaust heat produced from a transmission and motors such as power generation motor and/or driving motor.

In accordance with one aspect of the present disclosure, according to an aspect of the present disclosure, a vehicle heat exchange system is provided which is characterized by the fact that it includes:

a first heat exchanger that performs heat exchange between a first medium for use in cooling of an internal combustion engine and a second medium for use in cooling of an inverter;

a second heat exchanger that performs heat exchange between the first medium and a third medium for use in lubrication of a transmission and/or cooling of a motor;

a third heat exchanger that performs heat exchange between the second medium and the third medium;

a switch valve that enables selective switching between a first path that supplies the second medium having passed through the third heat exchanger to the inverter via an inverter radiator and a second path that supplies the second medium having passed through the third heat exchanger to the inverter via the first heat exchanger; and a control unit that controls the switch valve such that the second path is selected when the first medium is in a predetermined low-temperature state.

According to the aspect of the present disclosure, the control is implemented such that, for example, in an EV driving mode or the like after the start-up and before an internal combustion engine starts to operate in which the temperature of the first medium is low, the heat exchange between the first medium and the third medium is performed by the second heat exchanger, in addition to which the heat exchange between the first medium and the second medium is performed by the first heat exchanger, so that warm-up of the internal combustion engine can be promoted. By virtue of this, exhaust heat produced from the transmission and the motor can be effectively utilized.

The control unit can control the switch valve such that the second path is selected when the internal combustion engine is stopped and the first medium is in a predetermined low-temperature state. According to this aspect, when the internal combustion engine is stopped, the control is implemented such that the heat exchange between the first medium and the third medium is performed by the second heat exchanger and the heat exchange between the first medium and the second medium is performed by the first heat exchanger, by virtue of which warm-up of the internal combustion engine can be promoted and exhaust heat produced from the transmission and the motor can be effectively utilized.

However, it is preferable that the control unit controls the switch valve such that the first path is selected when the internal combustion engine is stopped and a temperature of the second medium is in a predetermined high-temperature state.

Also, it is preferable that the control unit controls the switch valve such that the first path is selected when the internal combustion engine is operating and the first medium is not in a predetermined low-temperature state.

According to these aspects, by virtue of the fact that the heat exchange between the first medium and the third medium is performed by the second heat exchanger and the heat exchange between the second medium cooled by the inverter radiator and then having cooled the inverter and the third medium is performed by the third heat exchanger, cooling of the third medium is performed. For this reason, the heat exchange of the third medium can be performed in a distributed manner by the second heat exchanger and the third heat exchanger and the load upon the inverter radiator can be reduced. Accordingly, as compared with a case where both of the inverter and the third medium are cooled by the second medium alone, reduction in the size of the inverter radiator can be achieved.

Further, it is preferable that the system is configured such that the first medium passes through the first heat exchanger after having passed through the second heat exchanger, the system further includes a first medium switch valve which enables selective switching between a third path that supplies the first medium after having cooled the internal combustion engine to the second heat exchanger via the internal combustion engine radiator and a fourth path that supplies the first medium after having cooled the internal combustion engine directly to the second heat exchanger, and the control unit controls the first medium switch valve such that the fourth path is selected when the first medium is in a predetermined low-temperature state, and the third path is selected when the first medium is not in a predetermined low-temperature state.

According to this aspect, when the internal combustion engine is stopped, the first medium is subjected to heat exchange with the third medium and, depending on the cases, further heat exchange with the second medium without involvement of the internal combustion engine radiator, as a result of which warm-up of the internal combustion engine can be efficiently performed and, when the internal combustion engine is operating and the first medium is not in a predetermined low-temperature state, the first medium is supplied to the internal combustion engine radiator and is thereby efficiently cooled.

Also, as the aforementioned third medium, it is preferable that the third medium passes through the third heat exchanger after having passed through the second heat exchanger. Since the configuration is such that the third medium passes through the third heat exchanger after having flowed through the second heat exchanger, the temperature of the third medium supplied to the third heat exchanger can be lowered in advance to some extent, by virtue of which the temperature rise of the second medium can be suppressed, so that reduction in the size of the inverter radiator can be achieved.

Note that the aforementioned third medium is an oil-based fluid for use in lubrication of transmission and cooling of the motor and it is preferable that the third medium is an automatic transmission fluid. In automatic transmission of vehicles, oil-based automatic transmission fluids (ATF) or continuously variable transmission fluids (CVTF) are used. For this reason, as a third medium different than the first medium and the second medium in which in general water-based coolant is used, automatic transmission fluid such as ATFs and CVTFs can be utilized for a dual purpose without using new liquid, and the oil-based medium excellent in its electrical insulation property can be adopted as the coolant for the electric systems.

According to the vehicle heat exchange system of the present disclosure, it is made possible to provide a vehicle heat exchange system that can effectively utilize the exhaust heat produced from the transmission and the motors.

DETAILED DESCRIPTION

Hereinafter, a vehicle heat exchange system of the present disclosure will be specifically described with reference to a preferred embodiment.

Figure 1:
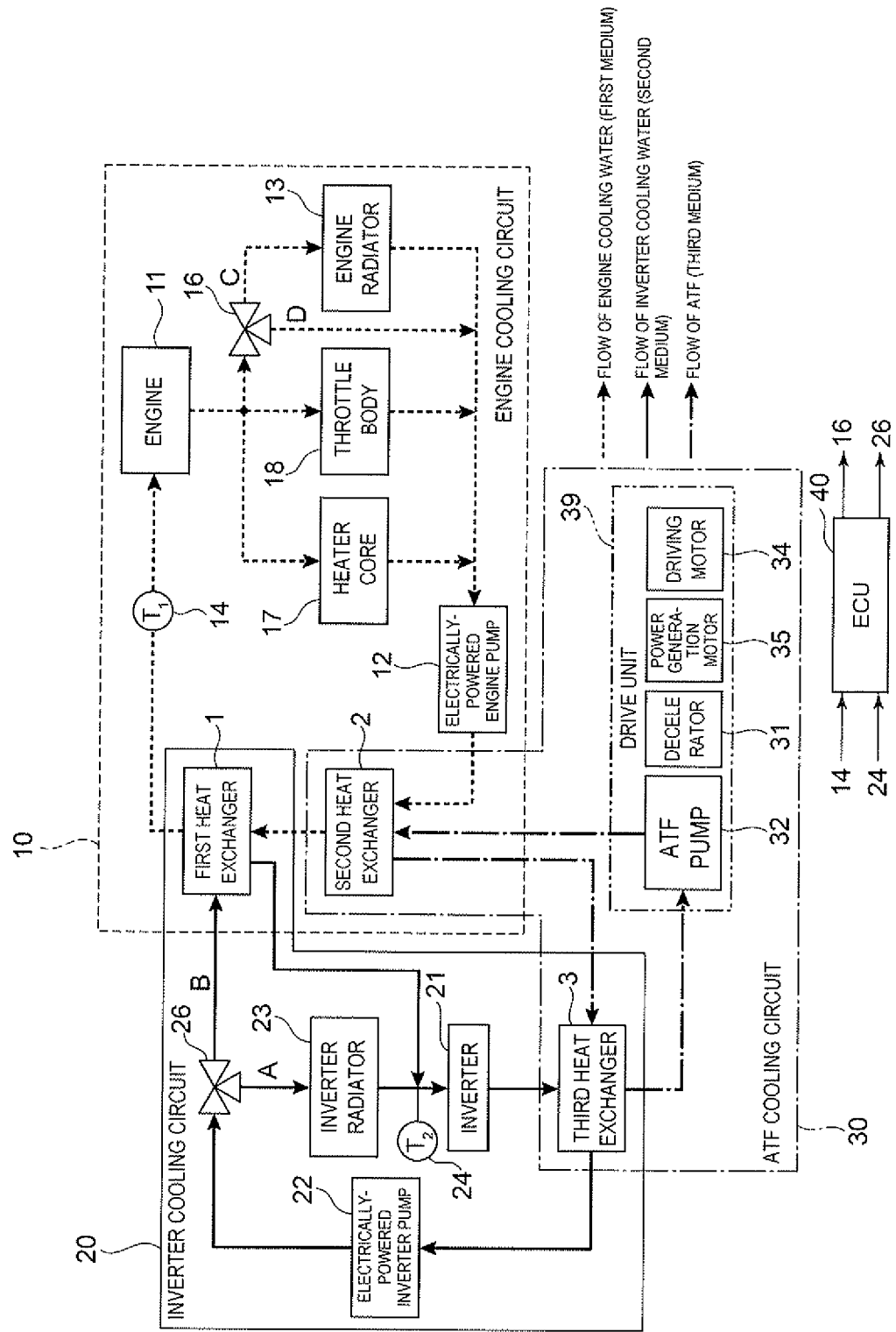
FIG. 1 is a block diagram that schematically illustrates an overall configuration of a vehicle heat exchange system in accordance with an embodiment which is an example illustrating the present disclosure.

FIG. 1 is a block diagram that schematically illustrates an overall configuration of the vehicle heat exchange system in accordance with an embodiment which is an example illustrating the present disclosure. The arrow lines in FIG. 1 each represents the flow of a medium in a circulation circuit for each of heat exchange media.

As illustrated in FIG. 1, the vehicle heat exchange system in accordance with the present embodiment includes three cooling (circulation) circuits, i.e., an engine cooling circuit (first medium cooling circuit) 10 configured to perform cooling of an engine 11 which is an internal combustion engine, an inverter cooling circuit (second medium cooling circuit) 20 for performing cooling of an inverter 21, and an ATF cooling circuit (third medium cooling circuit) 30 for cooling of an automatic transmission fluid (ATF) in a drive unit 39 which incorporates a decelerator (automatic transmission) 31, a driving motor (motor) 34, and a power generation motor (motor) 35.

Also, in the vehicle heat exchange system in accordance with the present embodiment, three heat exchangers, i.e., a first heat exchanger 1, a second heat exchanger 2, and a third heat exchanger 3 for mutual heat exchange of the heat of the media (cooling water, ATF) flowing in the individual cooling circuits are respectively provided across any two of these circuits.

The engine cooling circuit 10 includes, in addition to the engine 11, an electrically-powered engine pump 12 for pumping and circulating engine cooling water (first medium) to the engine cooling circuit 10, a water temperature meter $T_1$ 14 that measures the water temperature of the engine cooling water supplied to the engine 11, a heater core 17 for generating warm air during heating operation of a car air conditioner, a throttle body 18 including a throttle valve, and an engine radiator (internal combustion engine radiator) 13 for cooling of the circulating engine cooling water by heat dissipation. In this engine cooling circuit 10, the engine cooling water circulates as depicted by the flow indicated by the dotted arrows in FIG. 1.

The engine cooling water pumped from the electrically-powered engine pump 12 is first sent to a water jacket formed inside engine 11 via the second heat exchanger 2 and then the first heat exchanger 1. Here, the engine cooling water is used as a coolant for the engine 11. At the downstream side of the engine 11 in the engine cooling circuit 10, the water passage is split into three portions, which are individually connected to the heater core 17, the throttle body 18, and the water passage switch valve (first medium water passage switch valve) 16 which switches on and off the supply of the engine cooling water to the engine radiator 13, respectively.

The water passage switch valve 16 is an electromagnetic directional switching valve, and is configured to be capable of selective switching between a third path C in which the engine cooling water that has passed through the engine 11 flows toward the second heat exchanger 2 after having passed through the engine radiator 13 and a fourth path D in which it directly flows toward the second heat exchanger 2. As the engine radiator 13 provided in the engine cooling circuit 10, the one having a larger size and higher cooling capacity than the inverter radiator 23 provided in the inverter cooling circuit 20 is adopted. In the present embodiment, since the electrically-powered engine pump 12 is arranged before the second heat exchanger 2, the engine cooling water in any case flows toward the second heat exchanger 2 via the electrically-powered engine pump 12.

It should be noted that, in the present disclosure, the pump that generates a liquid flow in the cooling circuits (not only the engine cooling circuit 10 but all of the three cooling circuits) may be arranged anywhere in the path. In the present embodiment, the position where the pump is arranged is one of suitable examples, and is not limited in particular in the present disclosure. Also, as is the case with the engine cooling circuit 10 in the present embodiment, even when the electrically-powered engine pump 12 resides between the engine (internal combustion engine) 11 and the second heat exchanger 2, it is assumed that the engine 11 and the second heat exchanger 2 are directly coupled to each other and it is contemplated here that the state is entered where "the first medium (engine cooling water) that has cooled the internal combustion engine (engine 11) is directly supplied to the second heat exchanger (2)."

It is ensured that the engine cooling water that has been made to pass through the path C or the path D selectively by the water passage switch valve 16 merges with the engine cooling water that has flowed through the heater core 17 and the throttle body 18 and then flows back to the electrically-powered engine pump 12, and the engine cooling circuit 10 is formed as a closed circuit.

The inverter cooling circuit 20 includes, in addition to the inverter 21, an electrically-powered inverter pump 22 for pumping and circulating the inverter cooling water (second medium) to and in the inverter cooling circuit 20, a water temperature meter $T_2$ 24 that measures water temperature of the circulating inverter cooling water, and an inverter radiator 23 for cooling of the inverter cooling water by heat dissipation. In this inverter cooling circuit 20, the inverter cooling water circulates as depicted by the flow indicated by the solid arrows in FIG. 1. Specifically, the inverter cooling water passes through the inverter radiator 23, the inverter 21, the third heat exchanger 3, the electrically-powered inverter pump 22, and the water passage switch valve (switch valve) 26 in this order.

The water passage switch valve 26 is an electromagnetic directional switching valve, and is configured to be capable of selective switching between a first path A in which the inverter cooling water that has passed through the third heat exchanger 3 is supplied to the inverter 21 via the inverter radiator 23 and a second path B in which it is supplied to the inverter 21 via the first heat exchanger 1. It is ensured that the flows of the inverter cooling water passing through the respective paths merge into one single flow just before entering the inverter 21 and the inverter cooling circuit 20 is formed as a closed circuit.

The ATF cooling circuit 30 is a circuit that pumps the ATF (third medium) inside the drive unit 39 to the second heat exchanger 2 and the third heat exchanger 3 by the ATF pump 32 so as to make the ATF circulate for cooling. Inside the drive unit 39, the ATF pump 32, the decelerator 31, the driving motor 34, the power generation motor 35, and the like are incorporated.

In the drive unit 39, the ATF is pumped up by the rotation of one of the gears of the decelerator (transmission) 31 and supplied to the decelerator 31, and serves as a lubricant of the individual gears of the decelerator 31. Also, it is ensured that the ATF that has been pumped up by the ATF pump 32 is pumped to the ATF cooling circuit 30, in addition to which the ATF is made to flow to be applied to the driving motor 34 and the power generation motor 35. The ATF supplied to the decelerator 31 is used for the original function of the ATF. On the other hand, the ATFs that have been made to flow to be applied to the driving motor 34 and the power generation motor 35 functions to cool these motors.

In the ATF cooling circuit 30, the ATF circulates as depicted by the dash-dotted arrows indicated in FIG. 1. Specifically, the ATF that has been pumped out of the drive unit 39 by the ATF pump 32 flows through the third heat exchanger 3 after having flowed through the second heat exchanger 2 and then flows back to the drive unit 39, so that the ATF cooling circuit 30 is formed as a closed circuit.

The three heat exchangers including the first heat exchanger 1, the second heat exchanger 2, and the third heat exchanger 3 are a heat exchanger configured to perform liquid-to-liquid heat exchange. More specifically, it is a device which separates the flow paths of two liquids from each other by a partition made of a material with high thermal conductivity (for example, metal such as aluminum and stainless steel) so as to transfer heat from the high-temperature liquid to the low-temperature liquid across the partition and thereby realize the heat exchange. The two flow paths are sealed from each other such that the liquids are not mixed with each other, and it is ensured that different liquids are allowed to pass through the one flow path and the other flow path so as to realize heat exchange between these two liquids. By increasing the area of the partition between the two flow paths and increasing the thermal conductivity of the partition (including thinning), the heat exchange efficiency can be improved.

There is no limitation in particular in relation to these heat exchangers, and conventionally well-known ones can be used as a heat exchanger which performs the liquid-to-liquid heat exchange. Also, with regard to the first heat exchanger 1 and the second heat exchanger 2 or with regard to the second heat exchanger 2 and the third heat exchanger 3, since heat exchange takes place between a total of three media, for example, the three phase type heat exchanger described in Japanese Patent Application Laid-Open No. 2018-035953 can also be used. In a case where a three phase type heat exchanger is used, the device will be a single device according to an apparent device configuration, but the device is a device that has the functions of both of the two heat exchangers, and accordingly the device is treated as two heat exchangers in the interpretation of the present disclosure.

The vehicle heat exchange system of the present embodiment is controlled by an ECU (electronic control unit; control unit) 40. The ECU 40 is configured as a computer unit that includes a central processing unit (CPU) that executes various calculation processes related to the control of this heat exchange system, a read-only memory (ROM) unit that stores control programs and data, a random access memory (RAM) unit that temporarily stores calculation results of the CPU and external input information, and an input/output port (I/O) that mediates external data inputs/outputs.

Results of detection of the engine cooling water temperature measured by the water temperature meter $T_1$ 14 and the inverter cooling water temperature measured by the water temperature meter $T_2$ 24 are input to the ECU 40 via an input port. Also, with regard to the ECU 40, control signals are output from the ECU 40 via an output port to the water passage switch valve 16 and the water passage switch valve 26 in accordance with these results of detection as well as the status of operation or stoppage of the engine 11 separately determined by the ECU 40 itself, and by controlling this, the operation of the vehicle heat exchange system of the present embodiment is managed.

It should be noted that, in addition to those that have been mentioned above, results of detection of the temperature of the ATF in the drive unit 39, the outside temperature, the traveling speed of the vehicle, and the like are input to the ECU 40 and, with these conditions taken into account, the ECU 40 may more precisely control various devices and components, such as the electrically-powered engine pump 12, the electrically-powered inverter pump 22, the ATF pump 32, and the like as well as the water passage switch valve 16 and the water passage switch valve 26.

Next, the state of operation of the vehicle heat exchange system in accordance with the present embodiment will now be described for each of the vehicle's driving modes. In the following description, an example is described which is implemented based on a series-parallel hybrid scheme having the EV driving mode in which the engine 11 is stopped and the driving only relies upon the driving motor 34 and the HV driving mode in which and the engine 11 operates to drive the power generation motor 35 whose electrical power is used to operate the driving motor 34 so that the driving only relies upon the driving motor 34 or the driving takes place based on both of the outputs of the driving motor 34 that is made to operate in the same manner and the outputs of the engine 11.

Figure 5:
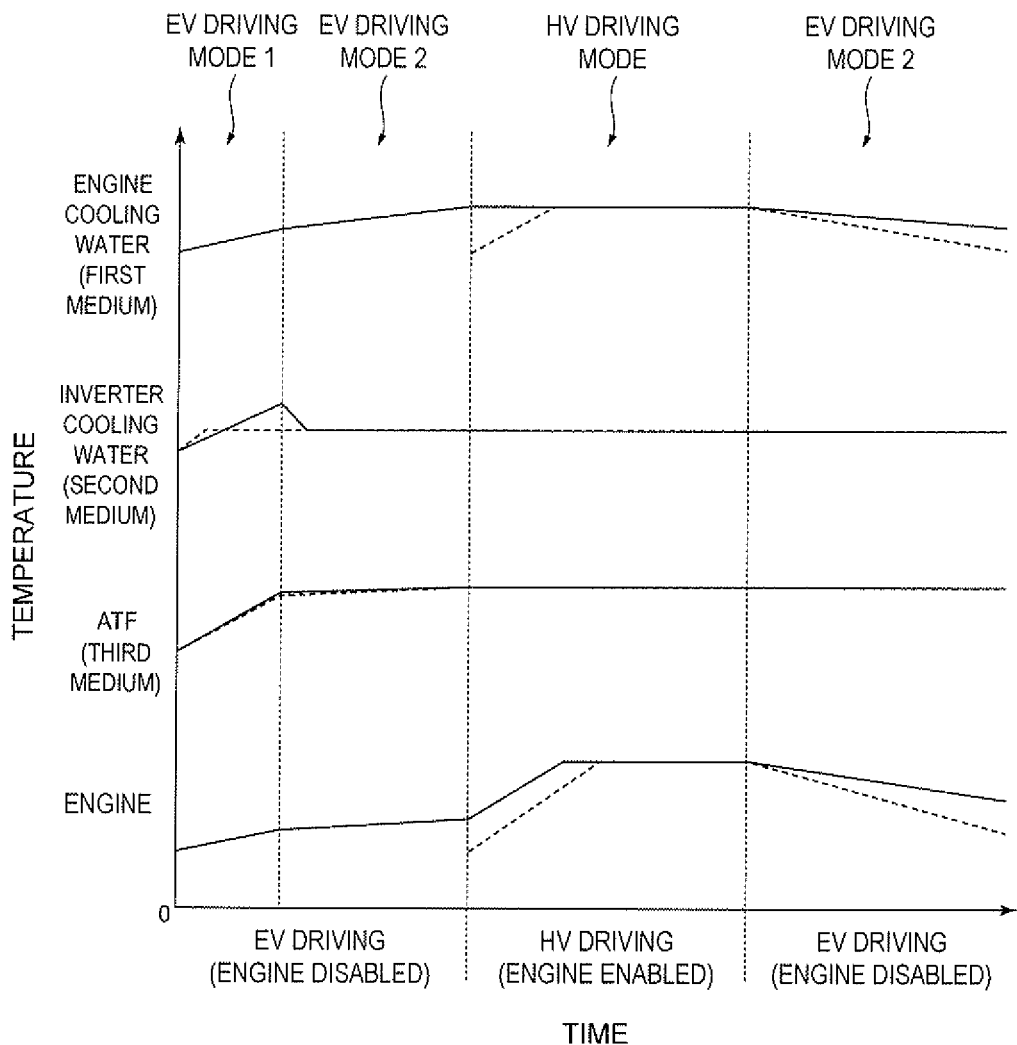
FIG. 5 is a graph that shows a relationship between an elapsed time since engine start-up and temperatures of media circulating in the individual circuits and the engine in the vehicle heat exchange system in accordance with the embodiment depicted in FIG. 1.

In addition to this, the temperature change of the media circulating in the individual circuits will be explained using the graph in FIG. 5. Note that FIG. 5 is a graph in which the expected values are plotted, wherein the horizontal axis indicates the elapsed time since the start-up (time 0) and the vertical axis indicates the temperatures of the individual media and the engine 11. In order to make it easier to understand, the graphs of the engine cooling water (first medium), the inverter cooling water (second medium), the ATF (third medium), and the engine 11 are distributed vertically but, at the start-up (time 0), these four are at substantially the same temperature.

The engine cooling water is the result of measurement of the water temperature meter ($T_1$) 14 and the inverter cooling water is the result of measurement of the water temperature meter ($T_2$) 24, respectively.

Note that the solid line in each graph plots the individual temperature changes in the present embodiment, and the broken line plots the individual temperature changes in the case where the first heat exchanger 1 and the second heat exchanger 2 are not provided (which is a state where the pipes of the circuit are directly coupled at the section of the heat exchanger. The third heat exchanger 3 is provided) as a reference.

EV Driving Mode 1

Figure 2:
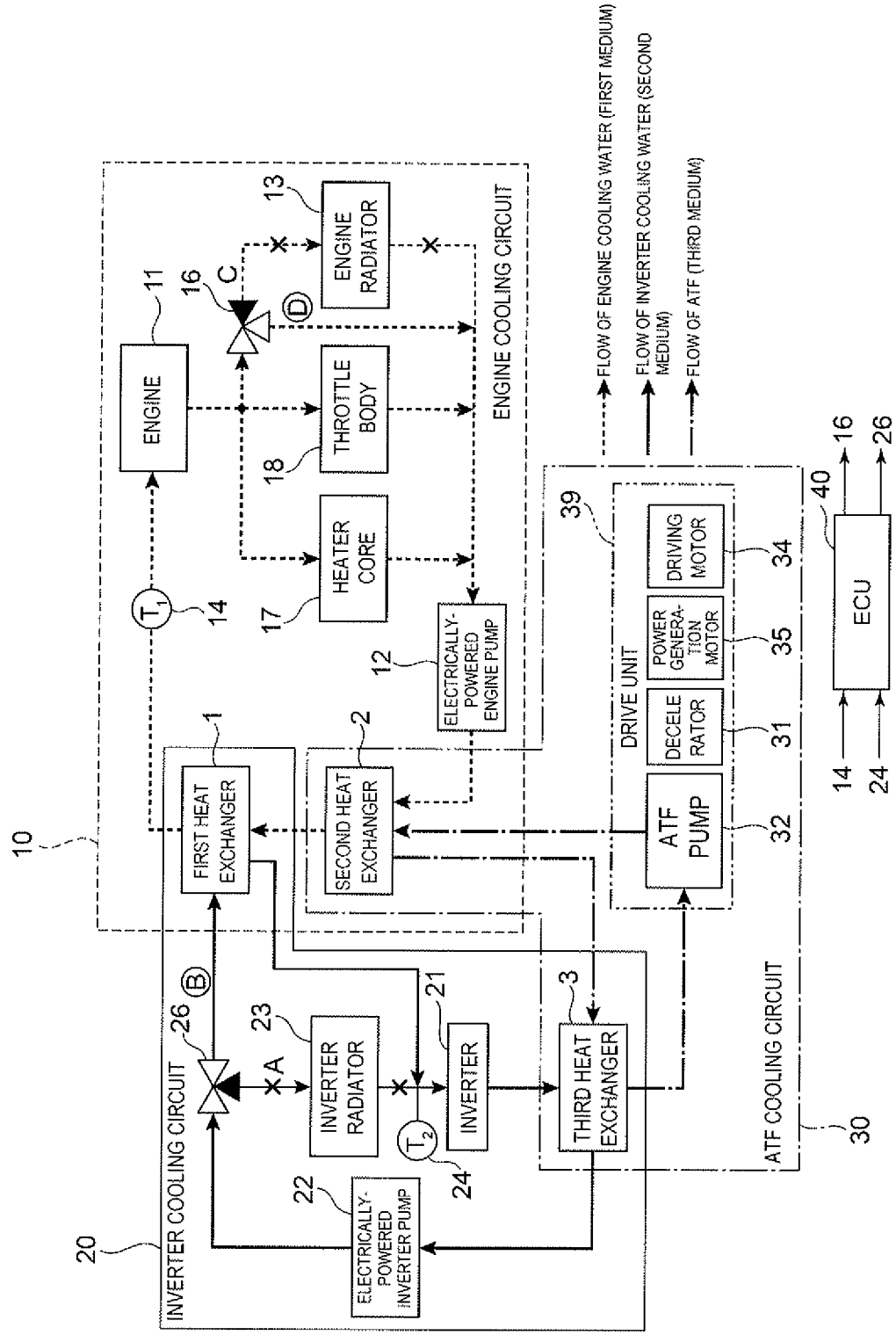
FIG. 2 is a block diagram that illustrates a state where operation takes place in an EV driving mode in the vehicle heat exchange system in accordance with the embodiment depicted in FIG. 1.

FIG. 2 is a block diagram that illustrates a state where the operation takes place in an EV driving mode at the time of start-up in the vehicle heat exchange system in accordance with the present embodiment.

In the EV driving mode, the ECU 40 controls the engine 11 to stop it. Especially at the time of the start-up, the engine 11 and the engine cooling water are in a very cold state, and warm-up is performed.

More specifically, in the EV driving mode at the time of the start-up, the ECU 40 confirms the state of the engine 11 being stopped, in addition to which the ECU 40 controls the system such that the fourth path D is selected with regard to the water passage switch valve 16 and the second path B is selected with regard to the water passage switch valve 26, respectively, if the engine cooling water temperature is in a predetermined low-temperature state according to the value of the water temperature meter 14. This is referred to as EV driving mode 1.

First, in the EV driving mode 1, the driving motor 34 and the inverter 21 operate in response to the start-up, and the ATF and the inverter cooling water which cools the driving motor 34 and the inverter 21 experience rise in their temperatures. Also, the decelerator 31 rotates in response to the driving of the vehicle, and the ATF used for the purpose of lubrication thereof is also warmed by the frictional heat of this decelerator 31. At this point, in the inverter cooling circuit 20, the inverter cooling water is heated as a result of the inverter cooling water having cooled the inverter 21, and is further subjected to heat exchange with the ATF by third heat exchanger 3, receives heat from the higher-temperature ATF and thus heated. In addition, the inverter cooling water flows through the path B which has been selected by the water passage switch valve 26, is subjected to heat exchange with the engine cooling water by the first heat exchanger 1, and then supplied again to the inverter 21. As a result of this, as illustrated in FIG. 5 (EV driving mode 1), the inverter cooling water will exhibit relatively rapid temperature rise.

Also, in the ATF cooling circuit 30, the ATF that has been heated by the driving motor 34, etc. is pumped from the drive unit 39, subjected to heat exchange with the engine cooling water by the second heat exchanger 2, further subjected to heat exchange with the inverter cooling water by the third heat exchanger 3, cooled by these two heat exchanges, and then flows back to the drive unit 39. However, the heating by the driving motor 34 is predominant and, as illustrated in FIG. 5 (EV driving mode 1), the ATF will exhibit relatively rapid temperature rise.

Meanwhile, in the engine cooling circuit 10, the engine cooling water is subjected to the heat exchange with the ATF at the second heat exchanger 2, further subjected to heat exchange with the inverter cooling water at the first heat exchanger 1, and provided in a warmed state for warm-up of the engine 11. In addition, since the engine cooling water that has cooled the engine 11 passes through the path D that has been selected by the water passage switch valve 16, the engine cooling water is supplied again to the second heat exchanger 2 without being cooled by the engine radiator 13. Hence, as illustrated in FIG. 5 (EV driving mode 1), the engine cooling water and the engine 11 exhibit gradual temperature rise.

As has been described in the foregoing, in a state, immediately after the start-up, where the engine 11 is stopped and driving only relies on the driving motor 34, the temperature of the engine cooling water for use in cooling of the engine 11 is low, so that the water passage switch valve 26 is controlled by the ECU 40 such that the second path B is selected. By virtue of this, the control is implemented such that the heat exchange between the engine cooling water and the ATF for use in cooling of the driving motor 34, etc. is performed at the second heat exchanger 2 and the heat exchange between the engine cooling water and the inverter cooling water warmed as a result of the inverter cooling water having cooled the inverter 21 is performed at the first heat exchanger 1. Hence, the warm-up of the engine 11 can be promoted. In this manner, the heat of the ATF by the exhaust heat or the like produced from the driving motor 34 can be effectively utilized.

(2) EV Driving Mode 2 (Before the HV Driving Mode)

Figure 3:
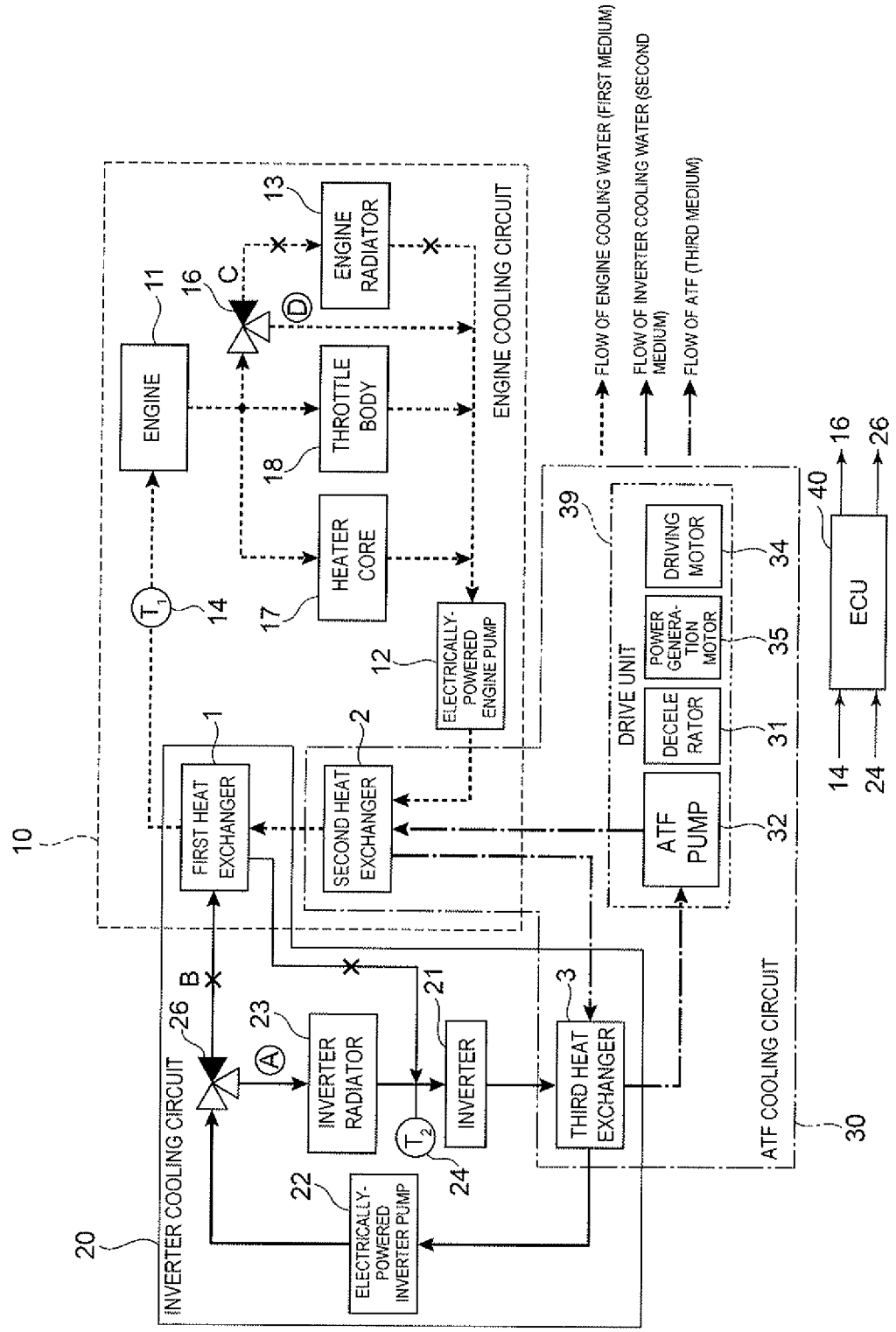
FIG. 3 is a block diagram that illustrates a state where the operation takes place in an EV driving mode when a temperature of inverter cooling water has risen in the vehicle heat exchange system in accordance with the embodiment depicted in FIG. 1.

FIG. 3 is a block diagram that illustrates a state where the operation takes place in an EV driving mode in a state where the temperature of the inverter cooling water has risen in the vehicle heat exchange system in accordance with the present embodiment.

In the EV driving mode, even when the ECU 40 has confirmed the state where the engine 11 is stopped, the ECU 40 receives the results of measurement of the water temperature meter ($T_2$) 24 and, in the case where the temperature of the inverter cooling water is in a predetermined high-temperature state, as illustrated in FIG. 3, controls the system such that, with regard to the water passage switch valve 16, the fourth path D is selected on an as-is basis and, with regard to the water passage switch valve 26, the first path A is selected, respectively. This is referred to as the EV driving mode 2.

At this point, in the inverter cooling circuit 20, in the same or similar manner as in the case of the EV driving mode 1, the inverter cooling water is warmed by cooling of the inverter 21, is further subjected to heat exchange with the ATF by the third heat exchanger 3, and receives heat from the higher-temperature ATF and is thus heated. In addition, the inverter cooling water that has entered the predetermined high-temperature state passes through the first path A and cooled by the inverter radiator 23, and then is supplied for cooling of the inverter 21. As a result of this, as illustrated in FIG. 5 (EV driving mode 2), the inverter cooling water exhibits relatively rapid temperature drop and saturation is reached when the temperature has decreased by a certain amount.

Also, in the ATF cooling circuit 30, the ATF that has been heated by the driving motor 34, etc. is pumped from the drive unit 39, subjected to heat exchange with the engine cooling water by second heat exchanger 2, further subjected to heat exchange with the inverter cooling water by third heat exchanger 3, and cooled by these two heat exchanges, and then the ATF flows back to the drive unit 39. At this point, since the inverter cooling water is cooled strongly by the inverter radiator 23, equilibrium is established between the heating by the driving motor 34 and the cooling by the two heat exchangers (the former is slightly more dominant), and as illustrated in FIG. 5 (EV driving mode 2 on the left side of the HV driving mode), the temperature rise of the ATF will peak, resulting in a slight temperature rise.

Meanwhile, in the engine cooling circuit 10, the engine cooling water is supplied for warming up the engine 11 in a state where the engine cooling water is subjected to the heat exchange with the ATF at the second heat exchanger 2 to be warmed and then just passes over the first heat exchanger 1. While the heat exchange with the inverter cooling water by the first heat exchanger 1 is not performed, since the influence of the heat exchange with the ATF at the second heat exchanger 2 is more significant, slowdown of the temperature rise of the engine cooling water does not become so large. In other words, as illustrated in FIG. 5 (EV driving mode 2), the engine cooling water and the engine 11 will exhibit a gradual temperature rise though the temperature rise will be slightly slowed down as compared with the case of the EV driving mode 1.

With regard to the determination by the ECU 40, which triggers the transition to the EV driving mode 2, that the temperature of the inverter cooling water is in the predetermined high-temperature state, for example, a temperature serving as a predetermined threshold may be specified in advance and the "high-temperature state" may be determined if the specified temperature has been exceeded, and it may be determined that "the high-temperature state is not entered" if it is not exceeded, but the determination is not limited to this.

For example, a mode may be contemplated in which the temperature serving as the threshold is not defined as one single value, where, by way of example, the temperature which is determined as the specified temperature as described above and which is the basis for determining that the "high-temperature state" is entered when it is exceeded and determining that the temperature has dropped and accordingly the "high-temperature state is not entered" is separately defined as a temperature lower than the defined specified temperature (a hysteresis state is specified).

Also, the ECU 40 may receive various pieces of information other than the temperature of the inverter cooling water, for example, pieces of information such as the water temperature of the engine cooling water, the temperature of the ATF, the outside temperature, the traveling speed of the vehicle, and the like and the determination of the "high-temperature state" or determination that the "high-temperature state is not entered" may be performed comprehensively with these pieces of information taken into account or in accordance with predetermined function calculation.

Note that, when the "temperature of the second medium" is mentioned in the context of the present disclosure, this refers, when applied to the present embodiment, to the temperature of the inverter cooling water whose portions have merged into one flow before flowing into the inverter 21 after the path branched into the portions for the first heat exchanger and the inverter radiator by the water passage switch valve 26.

As has been described in the foregoing, the heat exchange between the engine cooling water and the ATF is performed by the second heat exchanger 2, in addition to which the heat exchange between the inverter cooling water cooled by the inverter radiator 23 and then having cooled the inverter 21 and the ATF is performed by the third heat exchanger 3, and thereby cooling of the ATF that has been heated by the driving motor 34 or the like is performed. In this manner, the heat exchange of the ATF can be performed in a distributed manner by the second heat exchanger 2 and the third heat exchanger 3, and the load upon the inverter radiator 23 can be reduced. Accordingly, as compared to cooling both the inverter 21 and the ATF with the inverter cooling water alone, reduction in the size of the inverter radiator 23 can be achieved.

Also, since the configuration is such that the ATF passes through the third heat exchanger 3 after having flowed through the second heat exchanger 2, the temperature of the ATF supplied to the third heat exchanger 3 can be lowered in advance to some extent, by virtue of which the rise in the temperature of the inverter cooling water can be suppressed and reduction in the size of the inverter radiator 23 can be achieved.

(3) HV Driving Mode

Figure 4:
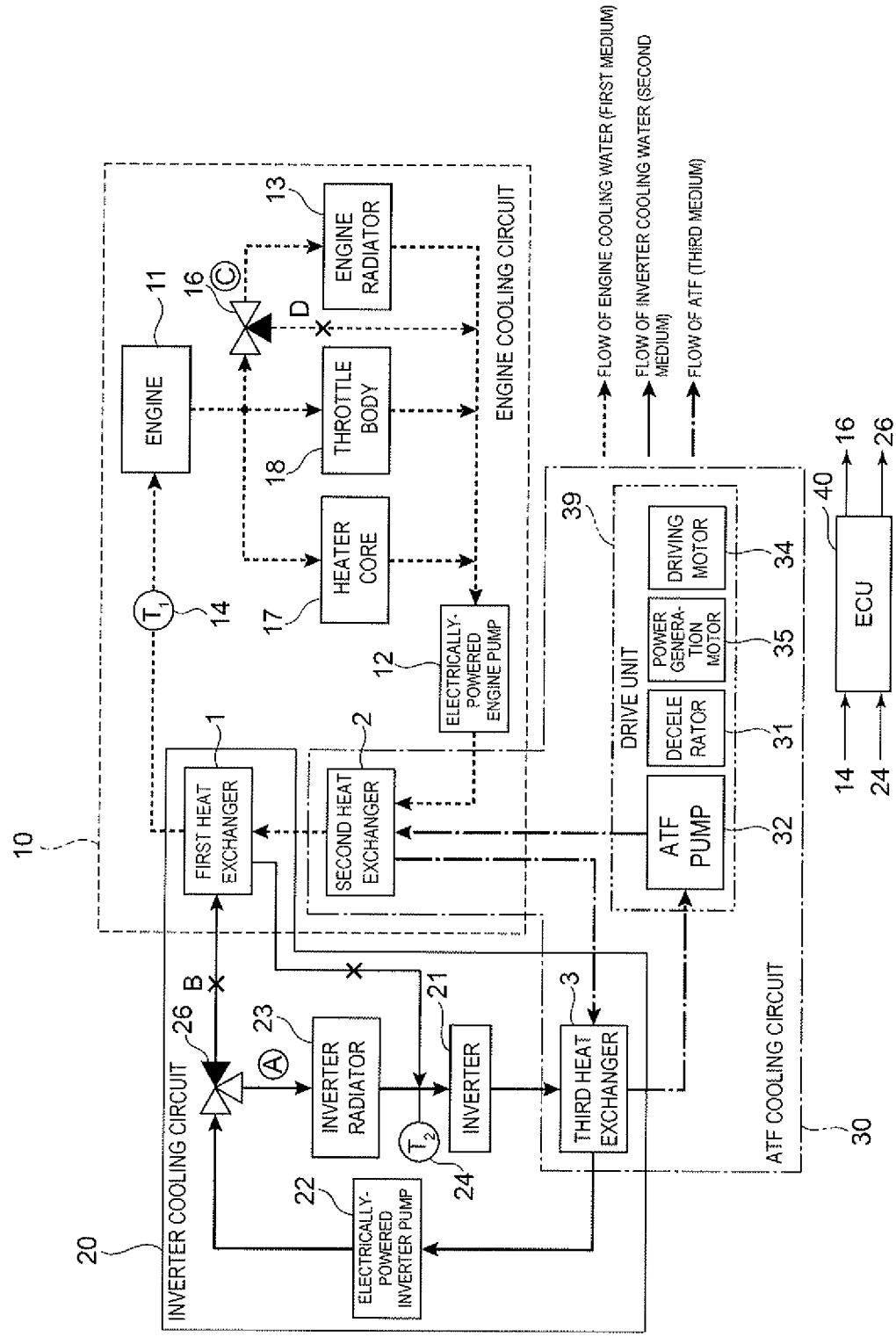
FIG. 4 is a block diagram that illustrates a state where the operation takes place in an HV driving mode in the vehicle heat exchange system in accordance with the embodiment depicted in FIG. 1.

FIG. 4 is a block diagram that illustrates a state where the operation takes place in an HV driving mode in the vehicle heat exchange system in accordance with the present embodiment.

A hybrid vehicle, in general, after having run to a certain extent in the EV driving mode, shifts to the HV driving mode when a condition is satisfied such as a condition that the driving speed is faster than a predetermined value or a condition that the remaining capacity of the battery is insufficient.

When the command of the ECU 40 causes the shift to the HV driving mode, then the engine 11 will operate. The ECU 40 confirms the state of the engine 11 operating and, if the temperature of the water temperature meter 14 is not in a predetermined low-temperature state, then, as illustrated in FIG. 4, controls the system such that the third path C is selected with regard to the water passage switch valve 16 and the first path A is selected with regard to the water passage switch valve 26, respectively. Note that, in the HV driving mode, the power generation motor 35 will also start to operate.

At this point, in the inverter cooling circuit 20, in the same or similar manner as in the case of the EV driving modes 1 and 2, the inverter cooling water is warmed as a result of the inverter cooling water having cooled the inverter 21, and is further subjected to heat exchange with the ATF by the third heat exchanger 3, and the inverter cooling water receives heat from the higher-temperature ATF and is thus heated. The ATF has the function of cooling not only the driving motor 34 but also the power generation motor 35 that has begun to operate inside the drive unit 39. In addition, the inverter cooling water that has entered the predetermined high-temperature state passes through the first path A to be cooled by the inverter radiator 23, and then is supplied for cooling of the inverter 21. As a result of this, with regard to the inverter cooling water, equilibrium is established between heating by the inverter 21 and the third heat exchanger 3 and cooling by the inverter radiator 23, and as illustrated in FIG. 5 (HV driving mode), the temperature is kept constant.

Also, in the ATF cooling circuit 30, the ATF that has been heated by the driving motor 34, the decelerator 31, and the power generation motor 35 is pumped from the drive unit 39 and, is subjected to heat exchange with the engine cooling water by the second heat exchanger 2, further subjected to heat exchange with the inverter cooling water by the third heat exchanger 3, cooled by these two heat exchanges, and then the ATF flows back to the drive unit 39. As will be described later, since cooling by the third heat exchanger 3 with the inverter cooling water that has been cooled strongly by the inverter radiator 23 is performed in addition to the cooling by the second heat exchanger 2 with the engine cooling water that has been cooled strongly by the engine radiator 13, equilibrium is established between heating by the driving motor 34, the decelerator 31, and the power generation motor 35 and cooling by the two heat exchangers, and as illustrated in FIG. 5 (HV driving mode), the ATF is maintained at a constant temperature.

Meanwhile, the engine 11 starts the operation and thereby produces high heat, and as illustrated in FIG. 5 (HV driving mode), exhibits a rapid temperature rise. Against this, the engine cooling water is cooled strongly by the engine radiator 13.

In the engine cooling circuit 10, the engine cooling water is supplied to the engine 11 in a state where the engine cooling water is subjected to the heat exchange with the ATF at the second heat exchanger 2 to be warmed and then just passes over the first heat exchanger 1, after having been cooled strongly by the engine radiator 13.

Even when heating through heat exchange with the ATF at the second heat exchanger 2 is done in addition to heating as a result of cooling of the engine 11 that emits high heat, strong cooling is performed by the engine radiator 13, so that equilibrium is established between the cooling thereby and the heating by all the two. As a result of this, as illustrated in FIG. 5 (HV driving mode), with regard to the engine cooling water, the temperature is kept constant. Also, with regard to the engine 11, the cooling with the engine cooling water will cause the temperature rise to peak, and the temperature on the way is kept constant.

As has been described in the foregoing, the heat exchange between the engine cooling water and the ATF is performed by the second heat exchanger 2, in addition to which the heat exchange between the inverter cooling water cooled by the inverter radiator 23 and then having cooled the inverter 21 and the ATF is performed by the third heat exchanger 3, and thereby the cooling of the ATF that has been heated by the driving motor 34, the power generation motor 35, etc. is performed. In this manner, the heat exchange of the ATF can be performed in a distributed manner by the second heat exchanger 2 and the third heat exchanger 3, and the load upon the inverter radiator 23 can be reduced. Accordingly, compared to cooling both the inverter 21 and the ATF with the inverter cooling water alone, reduction in the size of the inverter radiator 23 can be achieved.

Also, by virtue of the fact that, when the engine 11 is stopped, the engine cooling water is subjected to heat exchange with the ATF in the EV driving mode 2 and with the ATF and the inverter cooling water in the EV driving mode 1 without involvement of the engine radiator 13, so that the engine 11 can be warmed up efficiently and, on the other hand, when the HV driving mode is entered, the engine 11 is operating, the engine cooling water is not in a predetermined low-temperature state, and then the engine cooling water is supplied to the engine radiator 13 and thereby efficiently cooled.

(4) EV Driving Mode 2 (after the HV Driving Mode)

A hybrid vehicle, in general, shifts to the EV driving mode according to the determination by an ECU when it decelerates in the HV driving mode and the remaining capacity of the battery is sufficient. This also applies to the present embodiment.

When the command of the ECU 40 causes the shift from the HV driving mode to the EV driving mode, then the engine 11 stops. The ECU 40 confirms the state of the engine 11 being stopped and determines whether or not the engine cooling water temperature is at a predetermined low-temperature state.

At this point, since the temperature of the inverter cooling water is a sufficiently high temperature, the ECU 40 determines that the inverter cooling water is in the predetermined high-temperature state. Accordingly, in this case, in the same or similar manner as described in the "(2) EV Driving Mode 2," the ECU 40 controls the system, as illustrated in FIG. 3, such that the fourth path D is selected with regard to the water passage switch valve 16 and the first path A is selected with regard to the water passage switch valve 26, respectively.

In the inverter cooling circuit 20, in the same or similar manner as in the case of the HV driving mode, the inverter cooling water is warmed as a result of the inverter cooling water having cooled the inverter 21, and is further subjected to heat exchange with the ATF by the third heat exchanger 3, and receives heat from the higher-temperature ATF and thus heated. In addition, the inverter cooling water that has entered the predetermined high-temperature state passes through the first path A to be cooled by the inverter radiator 23, and then is supplied for cooling of the inverter 21. As a result of this, the inverter cooling water will have a heat balance similar to the saturating condition in the "(2) EV Driving Mode 2" and, as illustrated in FIG. 5 (EV driving mode 2 on the right side of the HV driving mode 1), the temperature is kept constant.

Also, in the ATF cooling circuit 30, the ATF that has been heated by the driving motor 34, etc. is pumped from the drive unit 39 and, is subjected to heat exchange with the engine cooling water by the second heat exchanger 2, further subjected to heat exchange with the inverter cooling water by the third heat exchanger 3, cooled by these two heat exchanges, and then the ATF flows back to the drive unit 39. At this point, since the inverter cooling water is cooled strongly by the inverter radiator 23, equilibrium is established between the heating by the driving motor 34 and the cooling by the two heat exchangers and, as illustrated in FIG. 5 (EV driving mode 2 on the right side of the HV driving mode), the ATF is maintained at a constant temperature.

Meanwhile, as a result of stoppage of the operation of the engine 11, new exhaust heat is not produced from the engine 11.

In the engine cooling circuit 10, the engine cooling water is supplied to the engine 11 after the engine cooling water is subjected to heat exchange with the ATF at the second heat exchanger 2 and then just passes over the first heat exchanger 1, without flowing through the engine radiator 13. At this point, since the engine cooling water is subjected to the heat exchange with the ATF and thus warmed, as illustrated in FIG. 5 (EV driving mode 2 on the right side of the HV driving mode), the temperature will gradually decrease. In response to this, with regard to the engine 11 as well, the temperature will decrease gradually.

The "predetermined low-temperature state" in the engine cooling water may refer, for example, to a state where the engine cooling water has not yet reached the temperature that is preferable or permissible to operate the engine in terms of efficient fuel consumption, driving stability, etc. and may also refer to a state where the engine cooling water has a lower temperature than that of the inverter cooling water. Further, it may also refer to a state where the engine cooling water has entered either one of these states or both of them, or may also refer to a state where it satisfies both of these conditions. Also, it may also be contemplated that an indicator of a temperature different than them may be determined as the "predetermined low-temperature state."

Note that, when the temperature of the first medium is mentioned in the statement "the first medium is in a predetermined low-temperature state" in the context of the present disclosure, if it is applied to the present embodiment, this refers to the temperature measured by the water temperature meter 14, i.e., the temperature of the first medium at the time of being supplied to the engine 11. However, it does not necessarily follow that the temperature measured immediately before the engine 11 should be relied on as the criterion and, in the context of the present embodiment, the temperature measured at any location in an interval before the electrically-powered engine pump 12 (preferably after passage through the second heat exchanger 2) to the engine 11 may be used as the criterion.

As has been described in the foregoing, whilst the present disclosure has been described with reference to a preferred embodiment, the vehicle heat exchange system of the present disclosure is not limited to the features of the above-described embodiment.

For example, in the above-described embodiments, the examples have been presented in which the third medium is the ATF (automatic transmission fluid), but the present disclosure is not limited to this, and as long as it is a cooling medium for use in cooling of motors such as a driving motor and a power generation motor, the present disclosure can be applied. In vehicles, for example, continuously variable transmission fluids (CVTFs) for use in continuously variable transmission and other heat media can be utilized, in addition to which a medium dedicated to cooling of a driving motor and a power generation motor may also be utilized. Among them, automatic transmission fluids such as ATFs and CVTFs are oil-based fluids and excellent in their insulation property, in addition to which their fluid volumes are relatively abundant and the decelerator, the driving motor, and the power generation motor are arranged close to each other according to layouts, so that it is particularly preferable that ATFs and CVTFs are adopted as the third medium in the present disclosure.

Also, the positions of arrangement of the first heat exchanger, the second heat exchanger, and the third heat exchanger in the individual circuits are not limited to the positions of the above-described embodiments. For example, with regard to the positions of the first heat exchanger 1 and the second heat exchanger 2 in the engine cooling circuit 10, they may have an inverted positional relationship with each other, may be arranged in front of the electrically-powered engine pump 12, or may be arranged at other locations. However, in order to efficiently perform the warm-up in the EV driving mode, it is desirable that the first heat exchanger 1 and the second heat exchanger 2 are arranged immediately before the engine 11.

Further, for example, the second heat exchanger 2 and the third heat exchanger 3 in the ATF cooling circuit 30 may have an inverted positional relationship with each other (i.e., the direction of circulation of the ATF is in the reverse direction). Needless to say, as has been discussed in the foregoing, the features of the above-described embodiments are particularly preferable, according to which the ATF passes through the third heat exchanger 3 after having passed through the second heat exchanger 2.

In addition, those skilled in the art would be able to modify the vehicle heat exchange system of the present disclosure as appropriate in accordance with conventionally known knowledge. It will be appreciated that such modifications are still included in the category of the present disclosure as long as they have the features of the vehicle heat exchange system of the present disclosure.

What is claimed is:

1. A vehicle heat exchange system, comprising:
   a first heat exchanger configured to perform heat exchange between a first medium for cooling an internal combustion engine and a second medium for cooling an inverter;
   a second heat exchanger configured to perform heat exchange between the first medium and a third medium for at least one of lubricating of a transmission and cooling a motor;
   a third heat exchanger configured to perform heat exchange between the second medium and the third medium;
   a switch valve configured to enable selective switching between (i) a first path that supplies the second medium that has passed through the third heat exchanger to the inverter via an inverter radiator and (ii) a second path that supplies the second medium that has passed through the third heat exchanger to the inverter via the first heat exchanger; and a control unit configured to control the switch valve such that the second path is selected when the first medium is in a predetermined low-temperature state.

2. The vehicle heat exchange system according to claim 1, wherein the control unit is further configured to control the switch valve such that the second path is selected when the internal combustion engine is stopped and the first medium is in the predetermined low-temperature state.

3. The vehicle heat exchange system according to claim 2, wherein the control unit is further configured to control the switch valve such that the first path is selected when the internal combustion engine is stopped and a temperature of the second medium is in a predetermined high-temperature state.

4. The vehicle heat exchange system according to claim 2, wherein the control unit is further configured to control the switch valve such that the first path is selected when the internal combustion engine is operating and the first medium is not in the predetermined low-temperature state.

5. The vehicle heat exchange system according to claim 1, further comprising a first medium switch valve, wherein:
the first heat exchanger and the second heat exchanger are arranged such that the first medium passes through the first heat exchanger after having passed through the second heat exchanger;
the first medium switch valve is configured to enable selective switching between (i) a third path that supplies the first medium that has cooled the internal combustion engine to the second heat exchanger via an internal combustion engine radiator and (ii) a fourth path that supplies the first medium that has cooled the internal combustion engine directly to the second heat exchanger; and
the control unit is further configured to control the first medium switch valve such that (i) the fourth path is selected when the first medium is in the predetermined low-temperature state, and (ii) the third path is selected when the first medium is not in the predetermined low-temperature state.

6. The vehicle heat exchange system according to claim 1, wherein the second heat exchanger and the third heat exchanger are arranged such that the third medium passes through the third heat exchanger after having passed through the second heat exchanger.

7. A vehicle heat exchange system, comprising:
a first cooling circuit through which a first medium is flowable;
a second cooling circuit through which a second medium is flowable;
a third cooling circuit through which a third medium is flowable;
an internal combustion engine arranged in the first cooling circuit and coolable via the first medium;
an inverter arranged in the second cooling circuit and coolable via the second medium;
a drive unit arranged in the third cooling circuit and coolable via the third medium;
a first heat exchanger arranged in the first cooling circuit and the second cooling circuit, the first heat exchanger configured to facilitate a heat exchange between the first medium and the second medium flowing therethrough;

a second heat exchanger arranged in the first cooling circuit and the third cooling circuit, the second heat exchanger configured to facilitate a heat exchange between the first medium and the third medium flowing therethrough;
a third heat exchanger arranged in the second cooling circuit and the third cooling circuit, the third heat exchanger configured to facilitate a heat exchange between the second medium and the third medium flowing therethrough;
a switch valve arranged in the second cooling circuit downstream of the third heat exchanger;
a control unit operatively connected to the switch valve;
the second cooling circuit including a first flow path and a second flow path that each extend from the switch valve to the inverter, the first heat exchanger arranged in the second flow path between the switch valve and the inverter;
an inverter radiator arranged in the first flow path of the second cooling circuit between the switch valve and the inverter;
wherein the switch valve is configured to selective switch between directing the second medium that has passed through the third heat exchanger to (i) the first path and (ii) the second path; and
wherein the control unit is configured to control the switch valve such that the second path is selected when the first medium is in a predetermined low-temperature state.

8. The vehicle heat exchange system according to claim 7, further comprising an inverter pump arranged in the second cooling circuit between the third heat exchanger and the switch valve.

9. The vehicle heat exchange system according to claim 7, wherein the first heat exchanger is arranged in the first cooling circuit downstream of the second heat exchanger such that the first medium passes through the first heat exchanger after having passed through the second heat exchanger.

10. The vehicle heat exchange system according to claim 9, further comprising an engine pump arranged in the first cooling circuit upstream of the second heat exchanger, wherein the internal combustion engine is arranged in the first cooling circuit between the first heat exchanger and the engine pump.

11. The vehicle heat exchange system according to claim 9, further comprising (i) a first medium switch valve arranged in the first cooling circuit downstream of the internal combustion engine and (ii) an internal combustion engine radiator, wherein:
the first cooling circuit includes:
a third flow path extending from the first medium switch valve to the second heat exchanger; and
a fourth flow path extending directly from the first medium switch valve to the second heat exchanger;
the internal combustion engine radiator is arranged in the third flow path between the first medium switch valve and the second heat exchanger;
the first medium switch valve is configured to selective switch between directing the first medium that has cooled the internal combustion engine to (i) the third flow path and (ii) the fourth flow path; and
the control unit is operatively connected to the first medium switch valve and is further configured to control the first medium switch valve such that (i) the fourth flow path is selected when the first medium is in the predetermined low-temperature state, and (ii) the third flow path is selected when the first medium is not in the predetermined low-temperature state.

12. The vehicle heat exchange system according to claim 7, wherein the third heat exchanger is arranged in the third cooling circuit downstream of the second heat exchanger such that the third medium passes through the third heat exchanger after having passed through the second heat exchanger.

13. The vehicle heat exchange system according to claim 12, wherein the drive unit is arranged in the third cooling circuit downstream of the third heat exchanger and between the third heat exchanger and the second heat exchanger.

14. The vehicle heat exchange system according to claim 7, wherein:
   the first medium and the second medium are each a water-based coolant; and
   the third medium is an oil-based fluid.

15. The vehicle heat exchange system according to claim 7, further comprising a temperature meter arranged in the first cooling circuit and configured to measure a temperature of the first medium, wherein:
   the temperature meter is operatively connected to the control unit; and
   the control unit is further configured to determine if the first medium is in the low-temperature state based at least partially on the temperature of the first medium measured by the temperature meter.

16. The vehicle heat exchange system according to claim 7, further comprising a temperature meter arranged in the second cooling circuit and configured to measure a temperature of the second medium, wherein:
   the temperature meter is operatively connected to the control unit; and
   the control unit is further configured to determine if the first medium is in the low-temperature state based at least partially on the temperature of the second medium measured by the temperature meter.

17. The vehicle heat exchange system according to claim 7, further comprising:
   a first temperature meter arranged in the first cooling circuit and configured to measure a temperature of the first medium;
   a second temperature meter arranged in the second cooling circuit and configured to measure a temperature of the second medium;
   wherein the control unit is operatively connected to the first temperature meter and the second temperature meter; and
   wherein the control unit is further configured to determine if the first medium is in the low-temperature state based on (i) the temperature of the first medium measured by the first temperature meter and (ii) the temperature of the second medium measured by the second temperature meter.

18. The vehicle heat exchange system according to claim 7, wherein the control unit is further configured to control the switch valve such that the second path is selected when the internal combustion engine is stopped and the first medium is in the predetermined low-temperature state.

19. The vehicle heat exchange system according to claim 7, wherein the control unit is further configured to control the switch valve such that the first path is selected when the internal combustion engine is stopped and a temperature of the second medium is in a predetermined high-temperature state.

20. The vehicle heat exchange system according to claim 7, wherein the control unit is further configured to control the switch valve such that the first path is selected when the internal combustion engine is operating and the first medium is not in the predetermined low-temperature state.

* * * * *